United States Patent [19]

Starkweather

[11] 4,080,633

[45] Mar. 21, 1978

[54] TWISTING GEOMETRY SCANNER

[75] Inventor: Gary K. Starkweather, Saratoga, Calif.

[73] Assignee: Xerox Corporation, Stamford, Conn.

[21] Appl. No.: 705,639

[22] Filed: Jul. 15, 1976

[51] Int. Cl.$^2$ ............................................. H04N 1/10
[52] U.S. Cl. ................................... 358/293; 358/213; 358/294
[58] Field of Search ............... 358/212, 213, 285, 293, 358/294; 350/167, 169

[56] References Cited

U.S. PATENT DOCUMENTS

| | | | |
|---|---|---|---|
| 2,627,199 | 2/1953 | O'Brien | 350/169 |
| 3,229,047 | 1/1966 | Simpson | 340/173 LT |
| 3,294,903 | 12/1966 | Goldmark | 358/109 |
| 3,947,627 | 3/1976 | Tanaka | 358/294 |
| 3,947,816 | 3/1976 | Rabedeau | 340/146.3 Z |
| 3,962,681 | 6/1976 | Requa | 358/213 |

Primary Examiner—Howard W. Britton
Attorney, Agent, or Firm—L. Zalman; S. F. Raizes; J. J. Ralabate

[57] ABSTRACT

An optical flying spot scanner having a lens array positioned between a scan line and a detector array and inclined at an angle to the axis of the scan line. Each of the lenses of the lens array has a coordinate position in a plane parallel to the scan line related to a particular segment of the scan line such that the information content of each segment of the scan line is transmitted to a different one of the tiered detectors of the detector array.

7 Claims, 3 Drawing Figures

TWISTING GEOMETRY SCANNER

BACKGROUND OF THE INVENTION

One type of conventional input scanning system for recording electronically the information content of a segment of a document utilizes a long, linear array of solid state photosensitive detectors and a multi-element lens system which conveys to the linear detector array variations in the light reflectance of the document segment as the document segment is scanned by a focused, high intensity light beam, such as a laser beam. To provide acceptable performance, the lens system is comprised of an array of three or four high quality lens elements which add substantially to system cost. Also, the lens array allows for only very slight variations in the depth of field of the system which may produce imaging errors if the document is wrinkled or otherwise has slight fluctuations in movement toward or away from the lens system.

Regarding the detector array, charge coupled devices are one type of photosensitive device which can be utilized as the elements of the detector array. When the bit density per unit length of the document segment is large (about 500 bits/inch) and the document is several unit lengths wide (standard paper width), the number of charge coupled devices that must be provided in a unitary, linear array is greater than can be provided by conventional semiconductor fabrication technology. For example, 7000 charge coupled devices on 0.51 mils centers would require an approximately 3.5 inch wafer of silicon—a formidable production task requiring unlikely breakthroughs in semiconductor fabrication technology to achieve acceptable yields. To overcome this problem, it has been proposed that several short, linear charge coupled device arrays be aligned along a single axis to provide the effect of one array long enough to provide for all of the bit storage needed. Implementation of long linear charge couple device arrays from a plurality of shorter linear charge couple device arrays requires that a crossover from one array to the next occur at some position along the scan line. Aligning the arrays, for example, so that the last detector of the previous array and the first detector of the next array lie on common centers, requires sensitive opto-mechanical tolerances which could be costly, difficult to maintain in a machine environment, and inconvenient to implement on a production basis. Furthermore, satisfactory electronic techniques are not now available for removing the tangential and sagittal misalignments inherent in the construction of a single, long linear array of detectors from an assembly of a plurality of short linear detector arrays.

OBJECTS OF THE INVENTION

It is an object of the present invention to provide an improved optical scanning system.

It is a further object of the present invention to provide an improved optical scanning system having reduced cost.

It is a still further object of the present invention to provide an improved optical scanning system having optical axis reorientation capabilities.

It is a still further object of the present invention to provide an improved optical scanning system having improved depth of focus tolerances.

SUMMARY OF THE INVENTION

In accordance with the invention, a flying spot scanning system is provided which utilizes a lens array tilted at an angle to a document scan line to convey the bit position information content of the document scan line onto a tiered array of light sensitive detectors disposed along an axis perpendicular to the axial direction of the scan line. The lens array has a lens of proper focal length associated with each scan segment of the document scan line and the detector array has a detector unit associated with each scan segment of the document scan line, with each detector unit having a detector element corresponding to each bit position of the scan segment associated with that detector unit, such that the information content of each scan segment is recorded on a different one of the tiered detector units of the detector array via a different lens of the lens array. Due to a twisting or axial reorientation of the information content of the scan line produced by the tilted lens array, a tiered or two dimensional (area) array of detector units can be utilized to record the information content of the scan line. Unlike long linear detector arrays, area detector arrays can be manufactured by conventional manufacturing techniques since they only require a rectangular-shaped semiconductor material wafer on the order of one inch by one quarter inch. While charge coupled devices are preferred for the detectors of the area detector array, photo diodes also can be used as the detectors of the array, and the photosensitive screen of a vidicon tube can be substituted for the detector array.

DETAILED DESCRIPTION OF THE INVENTION

Figure 1:
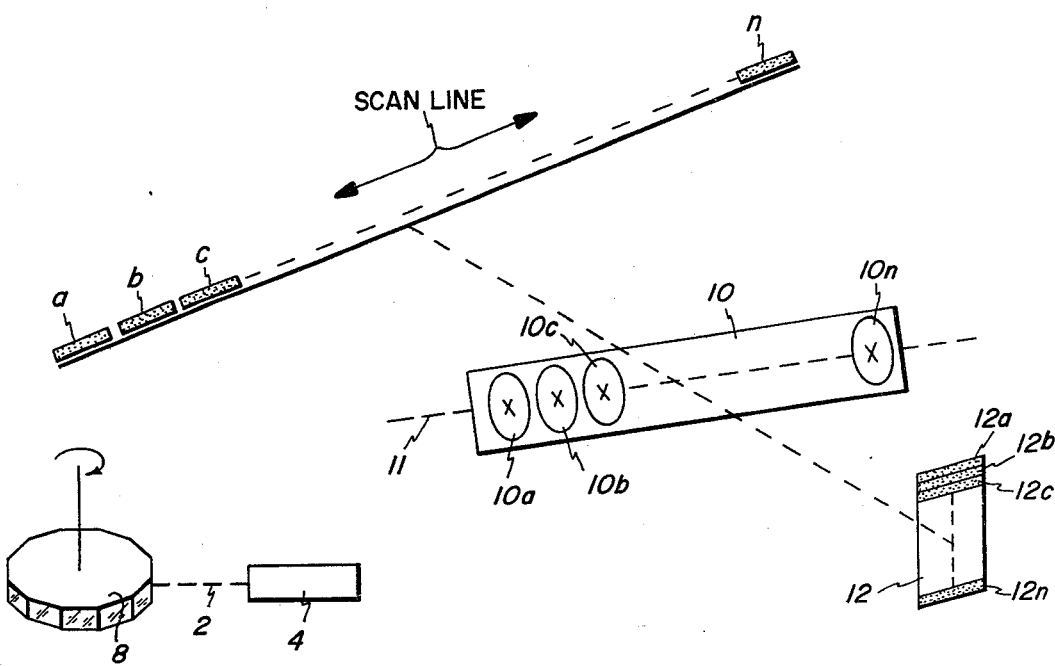
FIG. 1 is a perspective view of a flying spot scanning system in accordance with the invention.

Referring now to FIG. 1, a high intensity light beam 2, such as produced by a laser 4, is caused to scan in a conventional manner across a scan line of a document by a scanning polygon 8 having a rotational axis orthogonal to the plane in which the light beam 2 travels. The facets of the polygon 8 are mirrored for reflection of any illuminating light impinging thereupon such that rotation thereof produces flying spot scanning. Alternatively, flying spot scanning can be provided by other suitable devices, such as mirrored piezoelectric crystals or planar reflecting mirrors which are driven in an oscillatory fashion. The document scan line is linear and may be a portion of an information bearing document which conveys alphanumeric or facsimile information. The scan line is comprised of a plurality of information-bearing scan segments $a, b, c \ldots n$, of equal length, for example, each scan segment can be 1 inch long. The portions of the scanning light beam 2 reflected by the information-bearing segments of the scanned line are conveyed by a lens array 10 to an area array of light sensitive detectors 12.

Figure 2:
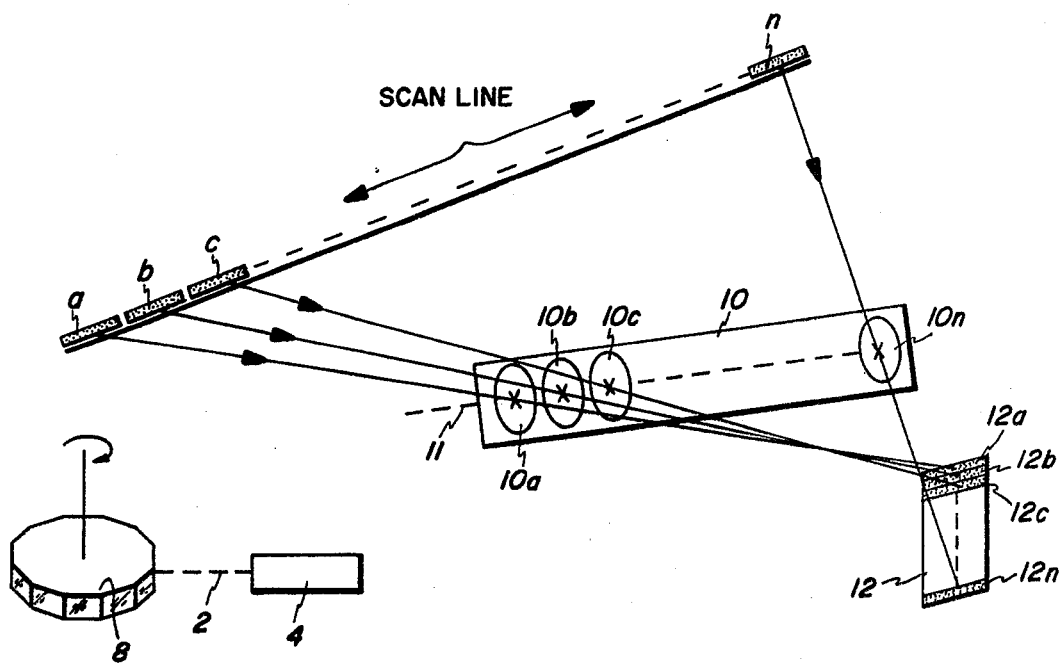
FIG. 2 is a further perspective view of a flying spot scanning system in accordance with the invention showing component correlations.

The lens array 10 contains a small lens (lenslet) for each information-bearing segment of the scan line, as shown by lenslets $10a, 10b, 10c \ldots 10n$ and the area detector array 12 likewise includes a detector unit for each of the information-bearing segments of the scan line as shown by tiered detector units 12a, 12b, 12c . . . 12n. The lens array 10 is disposed within a plane extending parallel to the longitudinal axis of the scan line, with the longitudinal axis 11 of the lens arrray 10 tilted at an angle to the longitudinal axis of the scan line. The lenslets of the lens array 10 are of appropriate focal lengths such that the information content of adjacent segments of the scan line is properly focused upon adjacent detectors of the detector array 12. For example, as is shown in FIG. 2, the information content of segment $a$ of the scan line is conveyed by lenslet 10a to detector 12a, the information content of segment $b$ of the scan line is conveyed by lenslet 10b to detector 12b, the information content of segment $c$ of the scan line is conveyed by lenslet 10c to detector 12c, with the information content of final segment $n$ being conveyed by lenslet 10n to detector 12n. Thus, the lens array 10 provides for projection or transmittance of the segment-wise information content of a scan line extending along a set longitudinal axis to the detector units of a detector array which detector units are tieredly disposed along an axis which is orthogonal to the longitudinal axis of the scan line.

The placement of the lenslet of the lens array 10 utilized to image the left-most segment of the scan line onto the top-most detector unit of the detector array 12 will now be explained in relation to FIG. 3 using an X, Y, Z coordinate system, with the X axis being the direction or axis of the scan line, the Z axis measuring the displacement of the lens array plane and the detector array plane from the Y axis, and the Y axis measuring the vertical displacement of the lenses of the lens array and the detectors of the detector array. The scan line, the lens array 10 and the detector array 12 are all centered about the origin of the X axis. The angle $\psi$ shown in FIG. 3 defines the abberation limits of each of the simple, low cost lenslets of the lens array 10, and for such lenslets $\psi$ is conventionally between 6°–12°. The magnification of the lenslet of FIG. 3 and its position at Z along the Z axis will dictate the position of its corresponding detector unit at $Z_d$ along the Z axis, that is, if the lenslet shown in FIG. 3 has a magnification of 2, then $Z_d$ will be 30 inches when $Z_l$ is 20 inches. The Y axis displacement of the top-most detector unit, that is, $Y_d$, is set by the physical dimensions of the entire detector array 12 and in practice will be less than 1 inch. Geometric considerations provide the relationship $$Z_d = (Y_d^2 + X_s^2)^{1/2} \cdot \cot\psi \qquad (1)$$

Figure 3:
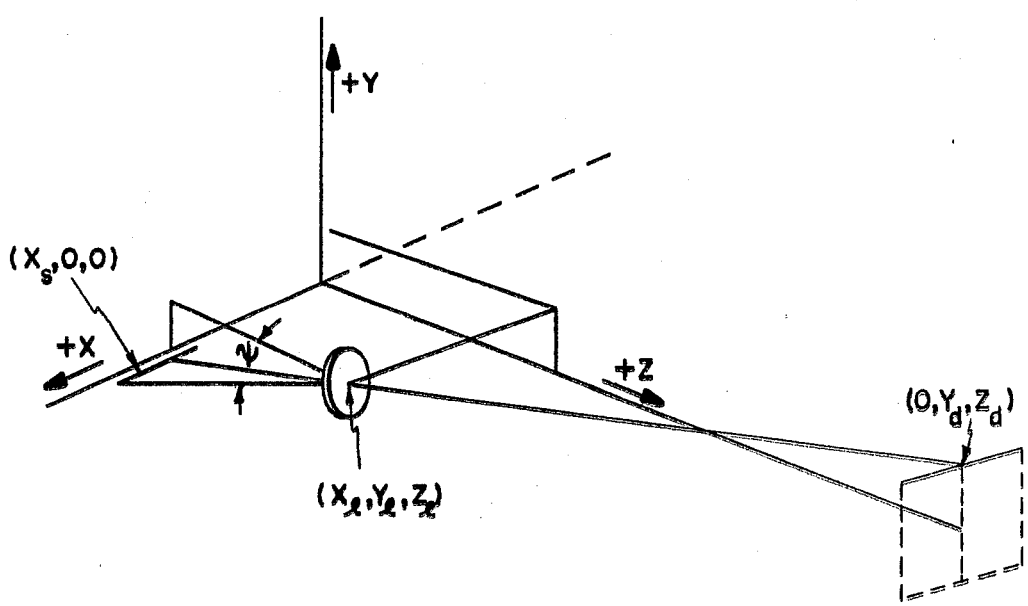
FIG. 3 is a perspective view of a portion of the flying spot scanning system in accordance with the invention showing axial displacements of system components.

Since $\psi$, $Y_d$ and $X_s$ are all known, $Z_d$ can be computed to give the Z axis displacement of the detector array. Once again geometric considerations provide the relationships $$Y_l = Y_d Z_l / Z_d \qquad (2)$$

$$X_l = X_s(Z_d - Z_l)/Z_d \qquad (3)$$

which allow the X and Y axis placements $X_l$ and $Y_l$ of the lens of FIG. 3 to be computed in terms of the known quantities $X_d$, $X_s$, $Z_d$ and $Z_1$, $Z_l$ being known because the magnification and half field angle would be previously selected. The X and Y axis placements of the lens for transmitting other segments of the scan line to other of the detectors of the detector array 12 are related to the placement of the first lens of the lens array 10 according to the relationships $$\Delta X = \Delta X_s (Z_d - Z_l)/Z_d \qquad (4)$$

$$\Delta Y = \Delta Y_d Z_l / Z_d \qquad (5)$$

with the quantities to the right in both equations (4) and (5) being known since the change in segment displacement $\Delta X_s$ is known because the length of each segment of the scan line has a predetermined value and the change in the detector displacement $\Delta Y_d$ is known from standards to which the detector array 12 is fabricated. Thus, the X-Y axis placement of all of the lenslets of the lens array can be computed, the Z axis displacement of all the lenslets of the lens array being equal.

The detector units of the detector array 12 are preferably change coupled devices, but other light responsive devices such as, for example, photo diodes, can be used for electronically storing the information content of the scan line. Also, the light responsive surface of the vidicon tube or similar tube can be disposed in the plane of the detector array 12 to provide for scanning electron beam readout.

The lens array 10 can be of glass or plastic and can be formed in a conventional manner by injection molding using a mold having a surface contour which provides a plurality of contiguous lenslets. If it is desired to provide lenses larger than can be provided in a line due to size restraints such that more light can be conveyed to the detector units of the detector array, the lenslet may be placed in other than a line provided that the lenslets have the proper X-Y displacement such that a line through the center coordinates of the lenslets is tilted at the appropriate angle to the scan line.

The scanning system of the invention can provide a sufficient number of resolvable elements to permit scanning and storage at conventional bit densities, for example, greater than 512 bits/inch can be stored. Also, the depth of focus of the lenslets of the present system is greater than that of conventional scanning systems of the same type thereby providing less error from document irregularities or document movement toward the plane of the detector array 12. The radiometry requirements of the present system are low and will permit other light sources than laser to be used to generate the scanning light beam.

What is claimed is:

1. A flying spot optical scanning system for scanning an information-bearing line divided into a plurality of segments comprising:
    means for scanning said information-bearing scan line with a light beam, said scan line extending in a predetermined axial direction;
    an area detector array including a plurality of detector units orientated along an axis perpendicular to said given axial direction; and
    an array of lenses orientated along an axis tilted with respect to the axial direction of said scan line in a manner whereby the information content of each of said segments of said scan line is conveyed upon a different one of said detector units.

2. The scanning system of claim 1 wherein said light beam comprises a laser beam.

3. The scanning system of claim 1 wherein said array of lenses includes a lens for each segment of said scan line, and said detector array includes a detector unit for each segment of said scan line.

4. The scanning system of claim 3 wherein said detector units are charge coupled devices.

5. The scanning system of claim 3 wherein the focal length of each lens is selected such that the information content of adjacent segments of the scan line is properly focused upon corresponding adjacent detector units of said detector array.

6. An optical scanning system for scanning an information-bearing line divided into a plurality of segments comprising:

means for illuminating said information-bearing scan line with light, said scan line extending in a predetermined axial direction, an area detector array including a plurality of detector units orientated along an axis perpendicular to said given axial direction; and an array of lenses orientated along an axis tilted with respect to the axial direction of said scan line in a manner whereby the information content of said segments of said scan line is conveyed upon a different one of said detector units.

7. The scanning system of claim 6, wherein the focal length of each lens is selected such that the information content of adjacent segments of the scan line is properly focused upon corresponding adjacent detector units of said detector array.

* * * * *